United States Patent
Jones

(10) Patent No.: US 10,120,138 B2
(45) Date of Patent: Nov. 6, 2018

(54) CONNECTOR WITH TRIGGER LOCKING FEATURE, AND CABLE ASSEMBLIES AND METHODS INCLUDING THE SAME

(71) Applicant: Corning Optical Communications LLC, Hickory, NC (US)

(72) Inventor: Ashley Wesley Jones, Denton, TX (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 15/618,265

(22) Filed: Jun. 9, 2017

(65) Prior Publication Data

US 2017/0357060 A1 Dec. 14, 2017

Related U.S. Application Data

(60) Provisional application No. 62/349,221, filed on Jun. 13, 2016.

(51) Int. Cl.
*G02B 6/36* (2006.01)
*G02B 6/38* (2006.01)
*H01R 13/627* (2006.01)

(52) U.S. Cl.
CPC ....... *G02B 6/3825* (2013.01); *H01R 13/6275* (2013.01); *G02B 6/3878* (2013.01); *G02B 6/3879* (2013.01); *G02B 6/3885* (2013.01); *G02B 6/3898* (2013.01)

(58) Field of Classification Search
CPC .. G02B 6/3893; G02B 6/3878; G02B 6/3879; G02B 6/3825; H01R 13/6271–13/6278
USPC .......................................................... 385/78
See application file for complete search history.

(56) References Cited

U.S. PATENT DOCUMENTS

| | | | |
|---|---|---|---|
| 4,647,726 A | 3/1987 | Blum | |
| 5,090,916 A | 2/1992 | Magnier | |
| 6,752,538 B1 * | 6/2004 | Bates, III | G02B 6/3893 385/136 |
| 6,821,024 B2 | 11/2004 | Bates, III | |
| 7,052,186 B1 * | 5/2006 | Bates | G02B 6/3879 385/139 |
| 7,892,012 B1 | 2/2011 | Foung | |
| 7,976,329 B2 | 7/2011 | Foung | |
| 8,038,460 B2 | 10/2011 | Andres et al. | |
| 8,152,385 B2 | 4/2012 | De Jong et al. | |

(Continued)

OTHER PUBLICATIONS

International Search Report and Written Opinion PCT/US2017/036780 dated Aug. 24, 2017.

*Primary Examiner* — Robert Tavlykaev
(74) *Attorney, Agent, or Firm* — Adam R. Weeks

(57) ABSTRACT

A fiber optic connector includes a connector sub-assembly having a connector body, a latch arm extending outwardly and rearwardly from a portion of the connector body, a housing in which a rear portion of the connector sub-assembly is received, and a trigger extending outwardly from the housing and over the end of the latch arm. An end of the latch arm can be depressed toward the connector body, and the trigger is configured to flex toward the housing to depress the latch arm. The connector includes a locking member movable between a rearward position in which the locking member prevents the trigger from depressing the latch arm, and a forward position in which the locking member allows the trigger to depress the latch arm.

26 Claims, 6 Drawing Sheets

(56) References Cited

U.S. PATENT DOCUMENTS

| | | |
|---|---|---|
| 8,221,007 B2 * | 7/2012 | Peterhans ............ G02B 6/3893 385/53 |
| 8,287,191 B2 | 10/2012 | Nielson et al. |
| 8,348,686 B1 | 1/2013 | Huang |
| 8,529,284 B1 | 9/2013 | Smith |
| 8,632,352 B2 | 1/2014 | Wagner |
| 8,783,968 B2 | 7/2014 | Adams |
| 2011/0286702 A1 | 11/2011 | Nielson et al. |
| 2011/0317976 A1 | 12/2011 | Eckstein et al. |
| 2013/0301994 A1 | 11/2013 | Motofuji |

* cited by examiner

CONNECTOR WITH TRIGGER LOCKING FEATURE, AND CABLE ASSEMBLIES AND METHODS INCLUDING THE SAME

CROSS-REFERENCE TO RELATED APPLICATIONS

This application claims the benefit of priority of U.S. Provisional Application No. 62/349,221, filed on Jun. 13, 2016, the content of which is relied upon and incorporated herein by reference in its entirety.

BACKGROUND

This disclosure relates generally to telecommunication cable assemblies, such as optical cable assemblies. More particularly, this disclosure relates to connectors (e.g., optical connectors) on telecommunication cable assemblies. The connectors include features that help maintain a secure connection between the connector and an adapter or other component to which the connector is mated.

Optical fibers and copper wires are useful in a wide variety of applications, including the telecommunications industry for data transmission. In a telecommunications system that uses either of these data transmission elements, there are typically many locations where cables that carry the elements connect to equipment or other cables. Connectors are often provided on the ends of the cables to conveniently provide these connections. The connectors are designed to engage adapters or other receptacles that align the connectors with other connectors or equipment so that data can be transmitted between the components.

Some connectors include one or more latch arms that extend outwardly from a connector body. Each latch arm is designed to engage the adapter in a manner that retains the connector in the adapter. Typically the latch arm must flex toward the connector body to fully insert the connector into the adapter. Once the connector is fully inserted, the latch arm is able to flex back away from the connector body to result in the engagement mentioned above. The connector then cannot be removed from the adapter unless the latch arm is flexed toward the connector body again.

Several connector designs exist incorporating features to prevent inadvertent removal of a connector from an adapter. In particular, several connector designs exist that incorporate features to prevent a latch arm of the connector from being moved toward the connector body. The features prevent movement of the latch arm itself or a trigger element ("trigger") that is otherwise configured to depress the latch arm. In essence, the latch arm or trigger is effectively "locked" to help prevent the connector from disengaging the adapter. The locking is typically reversible in that the latch or trigger can typically be "unlocked", i.e. placed back into a state that allows the latch arm to be depressed by the trigger or activated directly.

Although connector designs with locking features may exist, there remains room for improvement.

SUMMARY

Various embodiments of fiber optic connectors are disclosed. According to one embodiment, a fiber optic connector includes a connector sub-assembly having a ferrule configured to support at least one optical fiber, a connector body surrounding at least a portion of the ferrule, and a latch arm extending outwardly and rearwardly from a portion of the connector body. The ferrule defines a front of the fiber optic connector. An end of the latch arm can be depressed toward the connector body. The fiber optic connector also includes a housing in which a rear portion of the connector sub-assembly is received, a trigger extending outwardly from the housing and over the end of the latch arm, and a locking member movable between a forward position and a rearward position. The forward position is closer to the front of the fiber optic connector than the rearward position. Additionally, the locking member and trigger are configured so that the locking member prevents the trigger from depressing the latch arm in the rearward position of the locking member but allows the trigger to depress the latch arm in the forward position. In other words, although the trigger may be configured to flex toward the housing to depress the latch arm, this movement can be prevented when the locking member is in its rearward position.

According to another embodiment, a fiber optic connector includes a connector sub-assembly having a ferrule configured to support at least one optical fiber, a connector body surrounding at least a portion of the ferrule, a latch arm extending outwardly and rearwardly from a portion of the connector body. An end of the latch arm can be depressed toward the connector body. The fiber optic connector also includes a housing in which a rear portion of the connector sub-assembly is received and a trigger extending outwardly from the housing and over the end of the latch arm. The trigger is configured to flex toward the housing to depress the latch arm. The fiber optic connector further includes locking means for preventing the trigger from depressing the latch arm when the locking means is in a rearward position. The locking means is movable relative to the trigger to a forward position that is closer to a front of the fiber optic connector defined by the ferrule. The locking means allows the trigger to depress the latch arm in the forward position.

According to another embodiment, a fiber optic connector includes a connector sub-assembly having a ferrule configured to support at least one optical fiber, a connector body surrounding at least a portion of the ferrule, and a latch arm extending outwardly and rearwardly from a portion of the connector body. An end of the latch arm can be depressed toward the connector body. The connector also includes: a housing in which a rear portion of the connector sub-assembly is received; and a trigger extending outwardly from the housing and over the end of the latch arm. The trigger is configured to flex toward the housing to depress the latch arm. Additionally, the latch arm and trigger are coupled so that: a) flexing of the latch arm toward and away from the connector body results in flexing of the trigger toward and away from the housing, and b) flexing of the trigger toward and away from the housing results in flexing of the latch army toward and away from the connector body.

In a further aspect, some embodiments where the latch arm and trigger are coupled may also include a locking member movable relative to the trigger between two positions, with the locking member and trigger being configured so that the locking member prevents the trigger from depressing the latch arm in the one of the two positions but allows the trigger to depress the latch arm in the other of the two positions. For example, the two positions could comprise a forward position and a rearward position relative to the trigger.

Fiber optic connectors disclosed herein may be secured to an end of a cable that includes at least one optical fiber, thereby forming a fiber optic cable assembly.

Methods of securing the fiber optic connectors mentioned above are also disclosed. One method involves depressing the latch arm of the connector sub-assembly toward the connector body, wherein the locking member or locking means is in the forward position when the latch arm is depressed. The method also involves inserting a portion of the fiber optic connector into an adapter and causing the latch arm to move away from the connector body so that the latch arm engages the adapter in a manner that retains the portion of the fiber optic connector in the adapter. The locking member or locking means is then moved to the rearward position after the latch arm engages the adapter.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
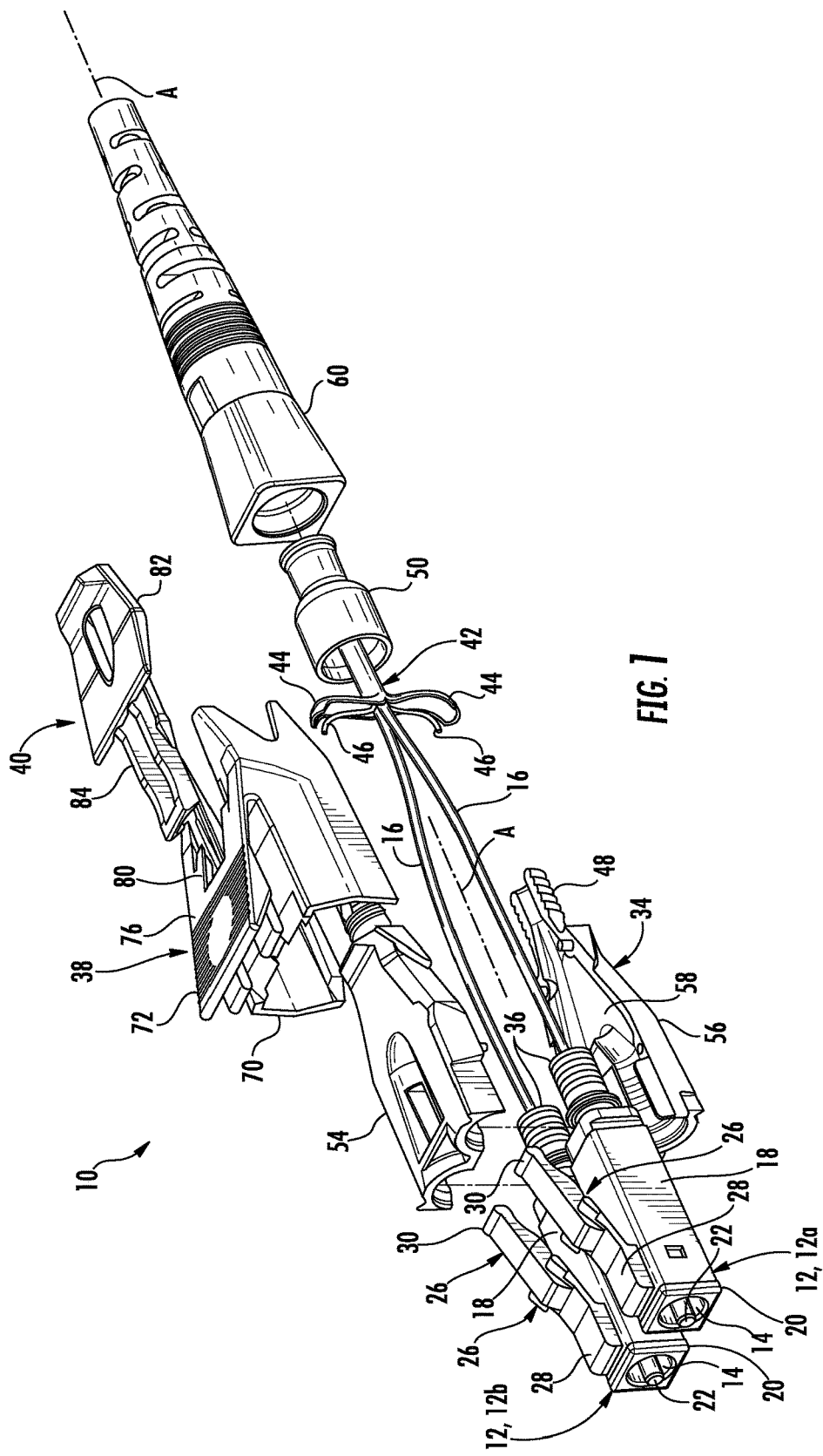
FIG. 1 is an exploded perspective view of one embodiment of a fiber optic connector.
Figure 2:
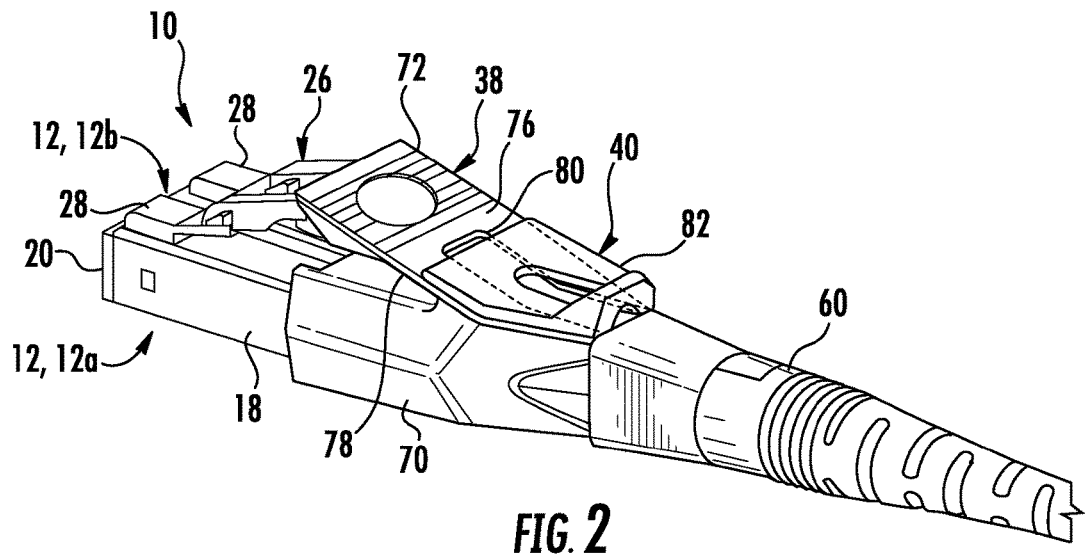
FIG. 2 is a perspective view of the fiber optic connector of FIG. 1 with a locking member of the fiber optic connector in a forward, unlocked position.
Figure 3:
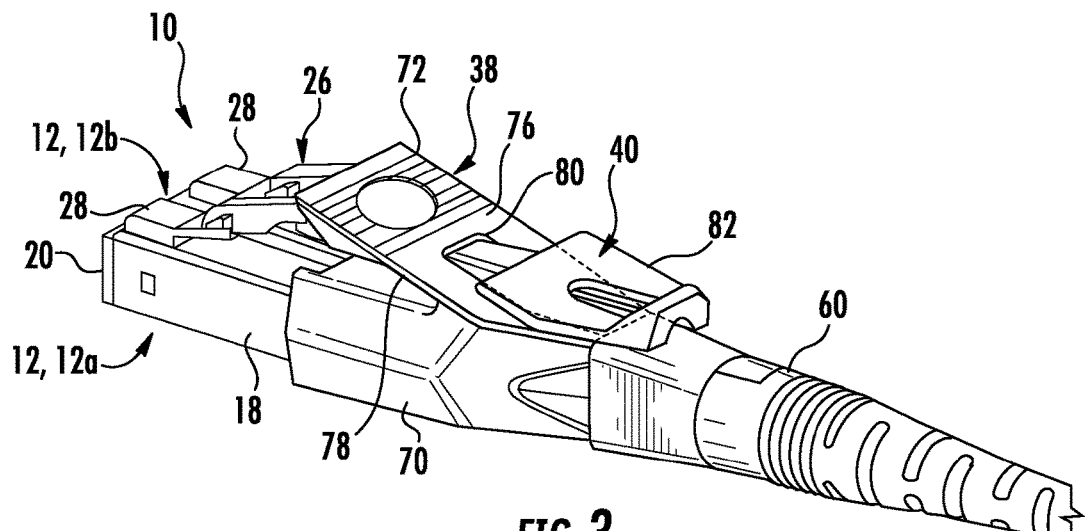
FIG. 3 is a perspective view similar to FIG. 2 with the locking member in a rearward, locked position.

Various embodiments will be further clarified by examples in the description below. In general, the description relates fiber optic connectors and cable assemblies including the same. One example of a fiber optic connector 10 (also referred to as "optical connector 10", or simply "connector 10") is shown in FIGS. 1-3. The connector 10 is shown in the form of an LC duplex connector having first and second LC connector sub-assemblies 12a, 12b (reference number 12 will be used to generically refer to a connector sub-assembly).

As shown in FIG. 1, each connector sub-assembly 12 includes a ferrule 14 configured to support an optical fiber 16 and a connector body 18 (also referred to as "connector sub-assembly housing 18, or simply "housing 18") surrounding a portion of the ferrule 14. The ferrule 14 extends from a ferrule holder (not shown) that is retained in the connector body 18 by a cap 20 or internal geometry of the connector body 18. A spring (also not shown) biases the ferrule holder forward within the connector body 18 so that a front end 22 of the ferrule 14 projects beyond the connector body 18. The front end 22 presents the optical fiber 16 for optical coupling with a mating component (e.g., another fiber optic connector).

Each connector sub-assembly 12 also includes a latch arm 26 extending outwardly and rearwardly from a portion of the connector body 18. Thus, the latch arm 26 has a proximal end 28 coupled to the connector body 18 and a distal end 30 spaced from the connector body 18. The distal end 30 of the latch arm 26 may be depressed toward the connector body 18 for mating purposes, as will be described in greater detail below.

Still referring to FIG. 1, the connector 10 also includes a housing 34 in which a rear portion of each connector sub-assembly 12 (e.g., rear portions 36 of connector body 18) is received, a trigger 38 extending outwardly from the housing 34 and over the distal end 30 of the latch arm 26, and a locking member 40 movable relative to the housing 34 and the trigger 38. The housing 34 may be attached to a fiber optic cable 42 ("cable 42") that includes the optical fibers 16. For example, the optical fibers 16 may be un-buffered fibers extending from within a cable jacket 44 of the cable 42. One or more strength members 46 (e.g., aramid yarn) also extend from the cable jacket 44. The strength members 46 may be secured to a rear portion 48 of the housing 34 by a crimp band 50 that is crimped onto the rear portion 48. In other embodiments, the cable 42 may have a different configuration or be secured to the housing 34 or other part of the connector 10 in a different manner (e.g., using an adhesive).

The housing 34 is shown as having a two-piece construction. First and second housing components 54, 56 attach together to define a cavity 58 of the housing 34. The optical fibers 16 are routed through the cavity 58 from the rear portion 48 of the housing 34 to the connector sub-assemblies 12. To help prevent sharp bends in the optical fibers 16 where the cable 42 is secured to the housing 34, the connector 10 further includes a boot 60 extending over a portion of the cable 42 and the housing 34.

The trigger 38 in FIG. 1 is shown as a separate component (e.g., a clip) removably attached to the housing 34, but may alternatively be integrally formed with the housing 34 so as to be part of a unitary (i.e., monolithic) structure with the housing 34. However, providing the trigger 38 as a removable component may provide certain benefits. For example, it may be possible to remove the trigger 38 and attach it to the opposite side of the housing 34. The connector sub-assemblies 12 may also be configured to independently rotate within the housing 48 so the latch arms 26 can be orientated on the opposite side of the connector 10 as well. Repositioning the trigger 38 and connector sub-assemblies 12 in such a manner reverses the polarity scheme of the connector 10. Additional details and advantages of such polarity reversal, and an exemplary configuration of the trigger 38 and housing 34 in general, are described in U.S. Pat. No. 8,152,385, whose disclosure of these aspects is herein incorporated by reference.

Before further discussing the trigger 38 and locking member 40, note again that the connector 10 is merely an example. Thus, although FIGS. 1-3 illustrate the connector 10 as an LC duplex connector, the features described below may be applicable to different connector configurations and different connector sub-assembly designs. This includes simplex configurations of LC connector sub-assemblies, and both simplex and duplex configurations of different (i.e., non-LC) connector sub-assembly designs. The cable 10 may likewise have a different design or configuration, as noted above.

With this in mind, a general overview of the trigger 38 and locking member 40 will first be provided, followed by a discussion of each component in further detail. As shown in FIGS. 2 and 3, the locking member 40 is movable relative to the housing 34 and trigger 38 between first and second positions, e.g. a forward position (FIG. 2) and rearward position (FIG. 3). The terms "forward" and "rearward" are relative terms that generally use the orientation of the connector 10 as a reference. For example, the connector 10 is generally considered to extend along a lengthwise axis A (FIG. 1). A front of the connector 10 is defined by the front ends 22 of the ferrules 14, and a rear of the connector 10 is defined by the rear portion 48 of the housing 34 or the boot 48. Thus, a forward direction is a direction from the rear of the connector 10 toward the front of the connector 10, along or parallel to the lengthwise axis. A forward position is one spaced from a rearward position in the forward direction.

In its forward position, the locking member 40 does not prevent the trigger 38 from moving (e.g., flexing) toward the housing 34 and depressing the latch arm 26. Thus, in the forward position, a user may press the trigger 38 toward the housing 34 to cause the distal ends 30 of the latch arms 26 to move toward the connector bodies 18. The forward position represents an "unlocked" position of the connector 10. In its rearward position, the locking member 40 prevents or blocks the trigger 38 from moving toward the housing 34 and depressing the latch arms 26. This represents a "locked" position of the connector 10. The locking member 40 may slide relative to the housing 34 and trigger 38 between the forward and rearward positions.

In the embodiment shown, the trigger 38 includes a shell or base 70 designed to be removably attached to the housing 34 and a trigger arm 72 joined to, but extending angularly away from, the shell 70. Thus, when the shell 70 is attached to the housing 34, the trigger arm 72 extends angularly away from the housing 34 as well. In fact, it is the trigger arm 72 in the particular embodiment shown that extends over the distal ends 30 of the latch arms 26. The general term "trigger" may be used in place of the more specific term "trigger arm" in this disclosure, especially in the claims that follow this detailed description, to take into account the possibility of alternative configurations (e.g., embodiments where the trigger is formed as part of the housing 34 or otherwise does not include the shell 70).

As shown in FIGS. 1-3, the trigger arm 72 includes a topside 76 facing away from the housing 34 (or away from the lengthwise axis A) and an underside 78 facing toward the housing 34 (or toward the lengthwise axis A). The trigger arm 72 also includes an opening 80 through which the locking member 40 extends. A proximal portion 82 of the locking member 40 is positioned behind the trigger arm 72, whereas a distal portion 84 of the locking member 40 extends through the opening 80 and under the trigger arm 72. More specifically, the proximal portion 82 of the locking member 40 is positioned on or rearward of the topside 76 of the trigger arm 72 in both the forward and rearward positions of the locking member 40. The distal portion 84 of the locking member 40 extends between the underside 78 of the trigger arm 78 and the housing 34 in both the forward and rearward positions. Even more specifically, the distal portion 84 of the locking member 40 extends between the underside 78 and the shell 70 in the embodiment shown.

Figure 4:
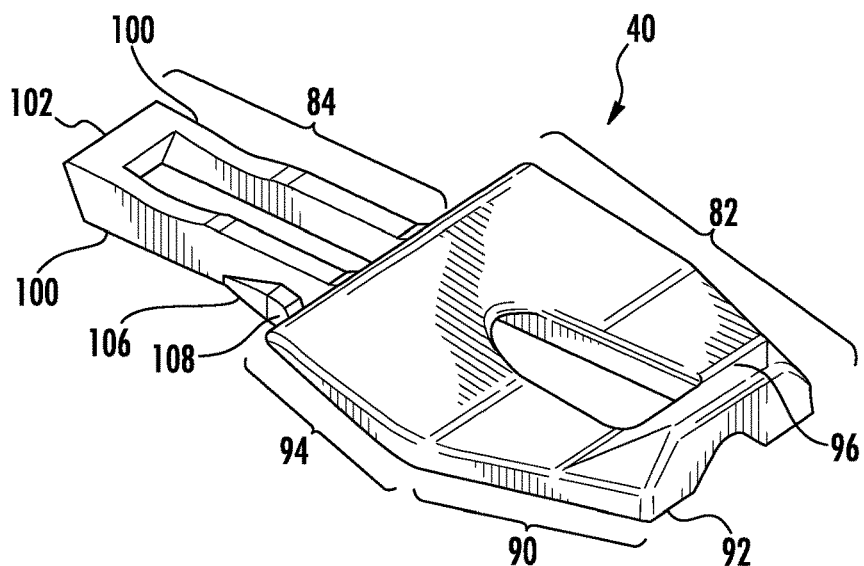
FIG. 4 is a perspective view from a first orientation of the locking member of the fiber optic connector of FIG. 1.
Figure 5:
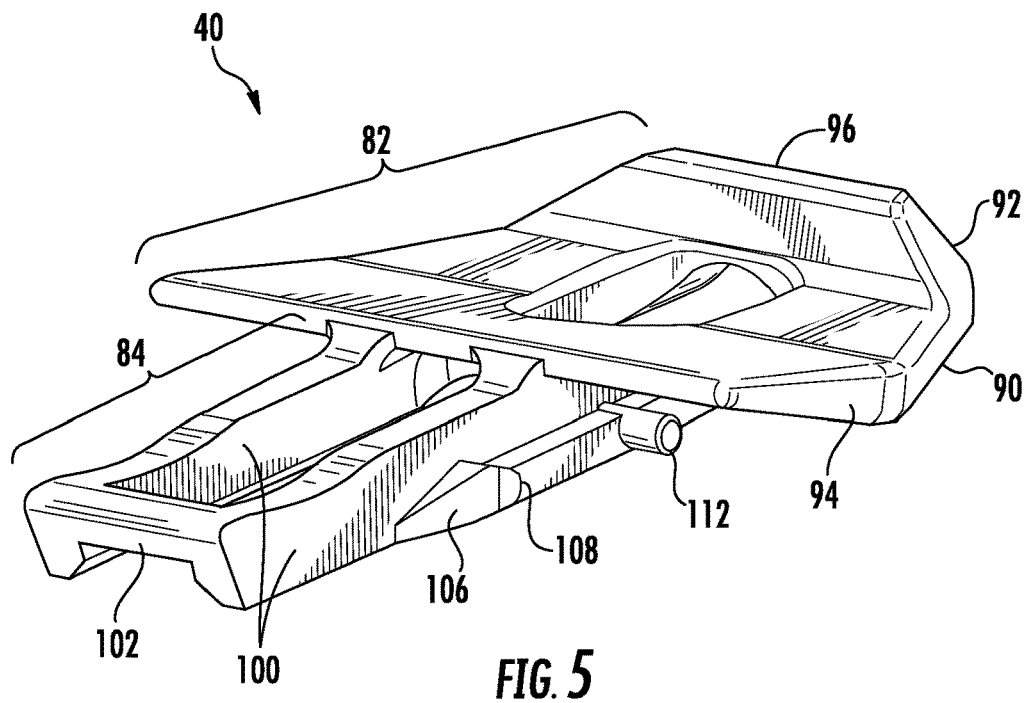
FIG. 5 is a perspective view from a second orientation of the locking member of the fiber optic connector of FIG. 1.

FIGS. 4 and 5 illustrate the locking member 40 in isolation. As shown in FIGS. 4 and 5, the proximal portion 82 is wider than the distal portion 84. The proximal portion 82 may, for example, have a front end 88 with a width greater than that of the opening 80 (FIG. 1) in the trigger arm 72, but equal to or less than that of the trigger arm 72 in general. In the embodiment shown, the proximal portion 82 includes a first segment 90 defining a rear end 92 of the locking element 40 and a second segment 94 bent or otherwise inclined relative to the first segment 90. Such a configuration enables the proximal portion 82 to have a shape generally conforming to or otherwise complementing that of the trigger 38, as will be described in greater detail below. The proximal portion 82 may also include a ramp, flange, ledge or other raised gripping element 96 to make it easier for a user to move the locking member 40 between its forward and rearward positions.

Still referring to FIGS. 4 and 5, the distal portion 84 in the embodiment shown includes axial or elongated bars 100 that are spaced apart from each other. The elongated bars 100 extend forward from an underside of the second segment 94 of the proximal portion 82 to a crossbar 102, which extends between the elongated bars 100. The distal portion 84 may also include one or more locking features configured to cooperate with complementary locking features on the trigger 38 to removably secure the locking member 40 in the forward position, rearward position, or both. In embodiment shown, wedges or ramps 106 are provided on lateral surfaces of the elongated bars 100. The ramps 106 define shoulders 108 facing the rearward direction. Thus, the ramps 106 extend outwardly from the lateral surfaces further than portions of the locking member 40 adjacent the ramps 106. The ramps 106—or more specifically, the shoulders 108 defined the ramps 106—may represent first locking features on the locking member 40.

The embodiment shown also includes pins or posts 112 extending outwardly (e.g., in a transverse direction) from the elongated bars 100. The posts 112 can be considered as defining shoulders as well or otherwise representing second locking features on the locking member 40. The posts 112 are located rearward of the ramps 106, at a location on the elongated bars 100 still under the second segment 94 of proximal portion 82. In alternative embodiments, the locking member 40 may only include first locking features, only include second locking features, or not have any locking features that secure the locking member 40 in its forward and rearward positions. Additionally, the locking features may have shapes or configurations other than ramps or posts.

Before further discussing the function of the first and second locking features mentioned above (e.g., the ramps 106 and posts 112), the manner by which the locking member 40 in the embodiment shown effectively "locks" the trigger 34 will be explained in more detail.

Figure 6:
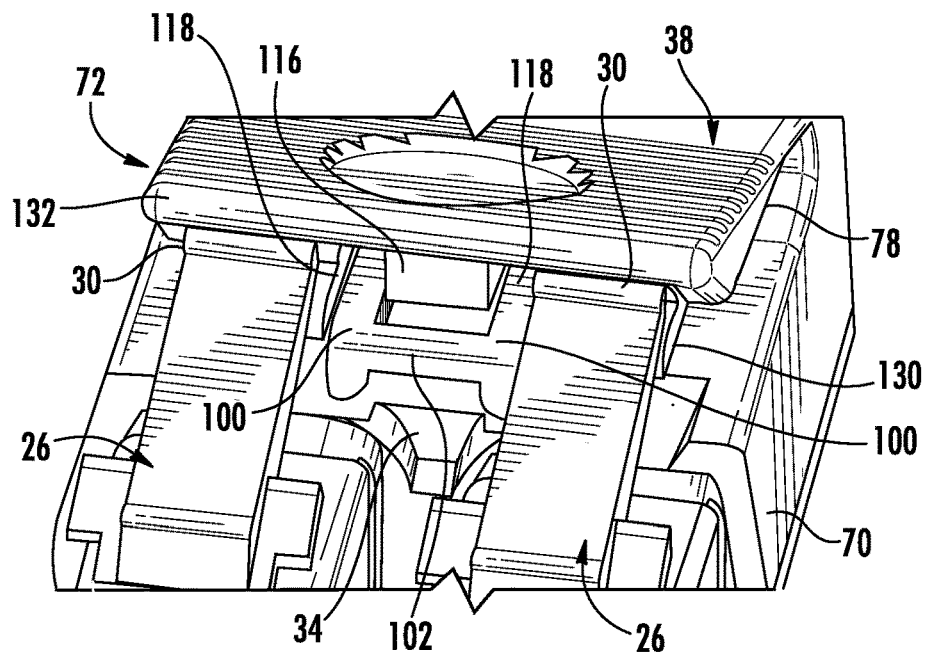
FIG. 6 is a close-up, perspective view of a portion of the fiber optic connector of FIG. 1, illustrating how the locking member does not interfere with movement of a trigger of the fiber optic connector in the forward, unlocked position.

Referring to FIG. 6, the underside 78 of the trigger arm 72 includes a wedge 116 between axial slots 118. The wedge 116 may initially be positioned above the elongated bars 100 of the locking member 40, as may be the case, for example, when the trigger arm 72 has not yet been depressed or otherwise moved in a direction toward the housing 34. The wedge 116 is sized to fit within space between the elongated bars 100. Additionally, when the locking member 40 is in its forward position, the crossbar 102 of the locking member 40 is positioned forward of the wedge 116. Thus, in the forward position of the locking member 40 (FIGS. 2 and 6), the wedge 116 can be received between the elongated bars 100 to allow the trigger arm 72 to move toward the housing 34 and shell 70 far enough depress the distal ends 30 of the latch arms 26. In other words, the crossbar 102 does not interfere or interact with the wedge 116 in the forward position of the locking member 40. The elongated bars 100 do not interfere with this movement as well, as the axial slots 118 are configured to receive/accommodate the elongated bars 100.

Figure 7:
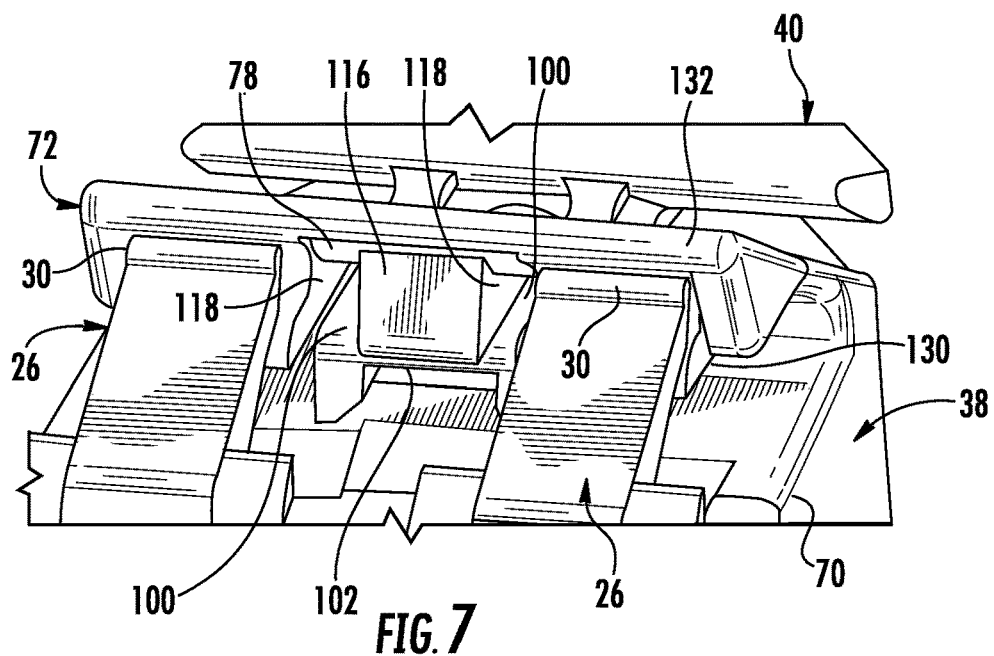
FIG. 7 is a close-up, perspective view of a portion of the fiber optic connector of FIG. 1, illustrating how the locking member blocks movement of the trigger in the rearward, locked position.

In contrast, and as shown in FIG. 7, the crossbar 102 is positioned under the wedge 116 when the locking member 40 is in its rearward position. Such an arrangement effectively prevents the trigger arm 72 from being moved towards the housing 34 and shell 70, or at least moved to an extent that may result in the latch arms 26 being depressed by the trigger 38 and moving from an initial position. For example, there may be contact between the wedge 116 and the crossbar 102 when the trigger arm 72 has not been moved at all from an initial position toward the housing 34. Alternatively, there may be contact very soon after such movement so that only a limited range of movement is possible. The trigger 38 and latch arms 26 in such alternative embodiments may be configured so that the trigger arm 72 does not depress the distal ends 30 of the latch arms 26 despite the limited range of movement.

As can be appreciated, the crossbar 102 defines a stop feature on the distal portion 84 of the locking member 40 in the embodiment shown. In other embodiments, the locking member 40 may have a different shape or configuration, yet still include a stop feature that functions in a manner similar to the crossbar 102. Thus, the stop feature may be in a form other than the crossbar 102.

Figure 8:
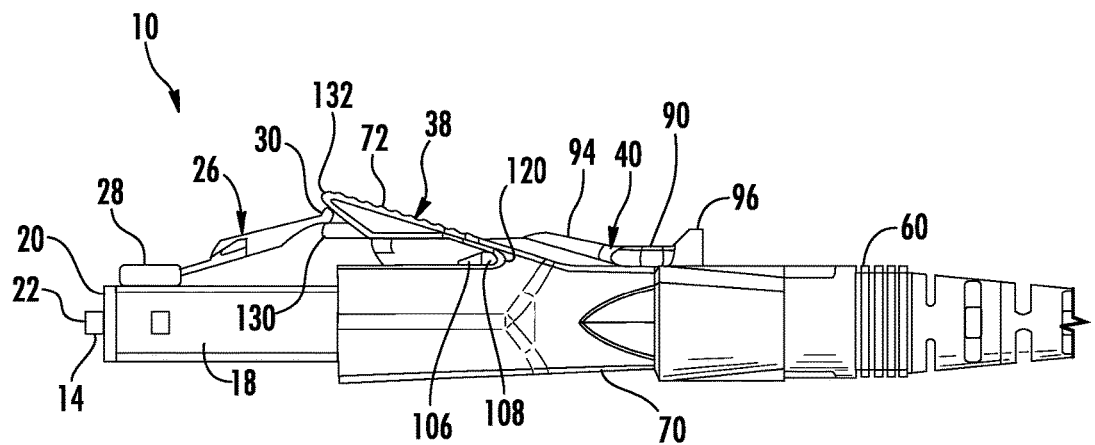
FIG. 8 is a side elevation view of the fiber optic connector of FIG. 1 with the locking member in the rearward, locked position.
Figure 9:
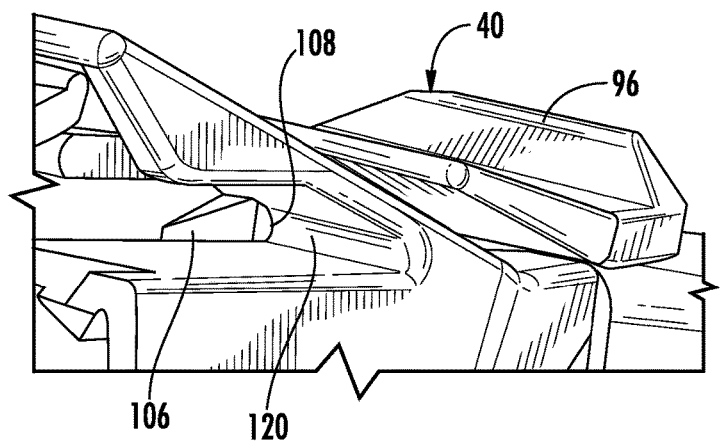
FIG. 9 is a close-up, perspective view of a portion of the fiber optic connector of FIG. 1, illustrating a rearward locking feature on the locking member.

FIG. 8 is a side view of the connector 10, still with the locking member 40 in its rearward position. As shown in FIGS. 8 and 9, the shoulders 108 on the ramps 106 are designed to engage a socket or elbow area 120 on the trigger 38 to removably secure the locking member 40 in the rearward position. For example, the shoulders 108 and socket area 120 may be configured to secure the locking member 40 in the rearward position using a snap-fit or interference fit. In other words, the shoulders 108 and socket area 120 may be designed so that at least some amount of force must be overcome to dislodge the locking member 40 from the rearward position. The gripping element 96 may facilitate this application of force. Because the shoulders 108 are referred to above as second locking features of the locking member 40, the socket area 120 may be considered as a complementary, second locking feature on the trigger 38. The shoulders 108 and socket area 120 may alternatively—and perhaps more appropriately—be referred to as "complementary rearward locking features" given that their function is associated with the rearward position of the locking member 40.

Figure 10:
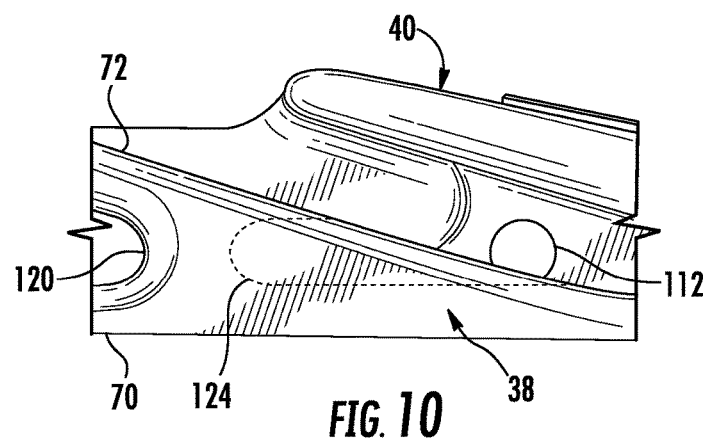
FIG. 10 is a close-up, side elevation view of a portion of the fiber optic connector of FIG. 1, illustrating complementary forward locking features on the locking member and trigger.
Figure 11:
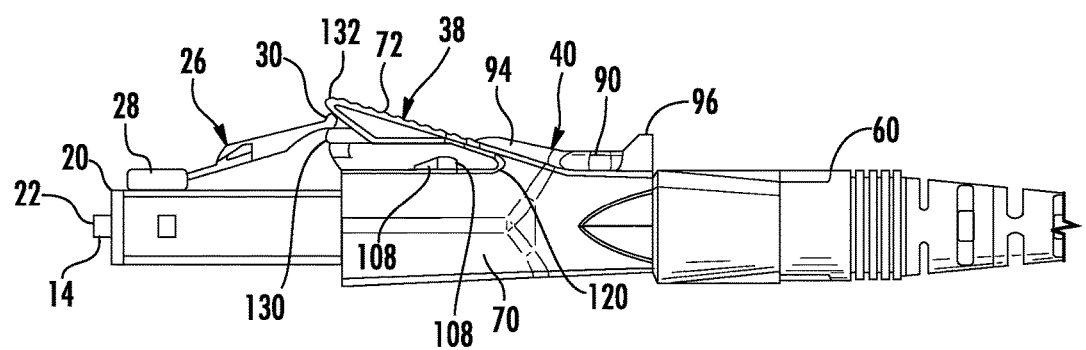
FIG. 11 is a side elevation view of the fiber optic connector of FIG. 1 with the locking member in the forward, unlocked position.

FIG. 10 illustrates a portion of the connector 10 in further detail when the locking member 40 is in its rearward position. As can be appreciated from FIG. 10, in this position, the posts 112 on the locking member 40 are rearward of slots or sockets 124 formed in the trigger 38. The slots 124 are provided in internal walls of the trigger arm 72 that define opposite sides of the opening 80 through which the locking member 40 extends. The slots 124 are configured to accommodate and receive the posts 112 when the locking member 40 is moved to its forward position, as shown in FIG. 11. The posts 112 and slots 124 may even be designed to removably secure the locking member 40 in the forward position, analogous to how the complementary rearward locking features may removably secure the locking member 40 in the rearward position. For example, the posts 112 and slots 124 may be configured to secure the locking member 40 in the forward position using a snap-fit or interference fit. Because the posts 112 are referred to above as first locking features of the locking member 40, the slots 124 may be considered as a complementary, first locking features on the trigger 38. The posts 112 and slots 124 may alternatively—and perhaps more appropriately—be referred to as "complementary forward locking features" given that their function is associated with the forward position of the locking member 40.

Having described the connector 10 in detail, an example method of securing the connector 10 to another component will now be described to provide additional context. For example, the connector 10 may be secured to an adapter (not shown) by first providing the connector 10 in an unlocked state, i.e. with the locking member 40 in its forward position relative to the housing 34 and trigger 38. A user may then depress the trigger arm 72 (i.e., push the trigger arm 72 toward the shell 70 and housing 34), which results in the trigger arm 72 depressing the latch arms 26. Depressing the latch arms 26 may be necessary to allow proper insertion of the connector sub-assemblies 12 into the adapter. Although the trigger arm 72 may serve as an actuation mechanism for depressing the latch arms 26, a user could depress the latch arms 26 directly if desired. Alternatively, the adapter and connector 10 may be designed such that the latch arms 26 are automatically depressed upon inserting the connector 10 into the adapter. In other words, the insertion motion may result in contact between the latch arms 26 and adapter that causes the latch arms 26 to flex toward the connector bodies 18 upon continued insertion.

Regardless of how the latch arms 26 are depressed, the latch arms 26 are allowed to flex back away from the connector bodies 18 when the relevant portion of the connector 10 has been fully inserted into the adapter. At this point, the latch arms 26 engage the adapter in a manner that retains the relevant portion of the connector 10 in the adapter. The user may then move the locking member 40 to its rearward position relative to the housing 34 and trigger 38. As described in detail above, in this rearward position, the locking member 40 prevents the trigger arm 72 from moving toward the housing 34/shell 70 and depressing the latch arms 26. Maintaining the trigger arm 72 outwardly helps prevent accidental actuation of the latch arms 26, which in turn helps prevent the connector 10 from being unintentionally removed from the adapter or otherwise losing is proper position for mating within the adapter.

When a user wishes to remove the connector 10 from the adapter, the user simply moves the locking member 40 back to its forward position relative to the housing 34 and trigger 38. As mentioned above, in this forward position, the latch arms 26 may be depressed (e.g., indirectly by the user depressing the trigger arm 72 or directly by the user depressing the latch arms 26 themselves). The latch arms 26 may be sufficiently depressed toward the connector bodies 18 so that the latch arms 26 no longer engage the adapter in a manner that retains the relevant portion of the connector 10 in the adapter. Thus, the connector 10 may then be removed from the adapter.

As can be appreciated, the connector has an "unlocked" and "locked" position based on whether the locking member 40 is in its forward or rearward position relative to the housing 34 and trigger 38. There are several advantages associated with the forward position being the unlocked position and the rearward position being the locked position. First, as mentioned above, the proximal portion 82 of the locking member 40 may have a shape generally conforming to or otherwise complementing that of the trigger 38. FIGS. 2 and 11 illustrate how the locking member 40 may "rest" on the trigger 38 in the forward position of the locking member 40. Specifically, the first segment 90 may rest on the shell 70, and the second segment 94 may rest on the topside 76 of the trigger arm 72. The complementary shapes help the connector 10 maintain a low profile, which can be important given the high-density and space constraints of environments where the connector 10 may be used.

Additionally, the locking member 40 is not obtrusive, i.e. does not significantly impede access to the trigger arm 38. A user is still able to depress the trigger arm 72 with relative ease despite the presence of the locking member 40. Thus, the trigger arm 72 is still able to function as an actuation mechanism for the latch arms 26.

Moreover, the connector 10 appears and functions "normal" when the locking member 40 is in its forward position. This is not the case in the rearward position of the locking member 40, as shown in FIGS. 3 and 8. Thus, when the locking member 40 is in its rearward position, there is a clear indication to users that something is different; that the connector 10 is not going to operate normally. This can be particularly useful when the connector 10 is properly seated in an adapter, as the visual indication alerts the user that an additional step is required before removing the connector 10 from the adapter. Accordingly, in general, the locking member 40 provides a visual indication or alert as to whether the connector 10 will operate as intended (e.g., with the latch arms 26 being able to deflect toward the connector bodies 18).

There are also general advantages to associating the locking function of the connector 10 with the trigger 38 rather than the latch arms 26 themselves, as is the case with many existing designs. In particular, the trigger 38 is the component directly actuated by the user, and the locking member 40 directly interfaces with trigger 38 to achieve the "lock". This may result in a stiffer, more direct locking mechanism compared to designs where a locking member interfaces with the latch arms 26.

Certain additional advantages may be obtained by coupling the trigger arm 72 to the latch arms 26 so that the latch arms 26 and trigger arm 72 are configured to effect movement of each other. In other words, the latch arms 26 and trigger arm 72 may be coupled so that: a) movement of the trigger arm 72 both toward and away from the housing 34 results in movement of the latch arms 26 toward and away from the connector bodies 18 (i.e., the trigger 38 can cause the latch arms 26 to flex toward and away from the connector bodies 18), and b) movement of the latch arms 26 both toward and away from the connector bodies 18 results in movement of the trigger arm 72 both toward and away from the housing 34 (i.e., the latch arms 26 can cause the trigger 38 to flex toward and away from the housing 34). The manner in which the trigger arm 72 and latch arms 26 are coupled may vary. In the embodiment shown in FIGS. 8 and 11, different portions of the trigger 38 effectively trap or "sandwich" the distal ends 30 of the latch arms 26. In particular, and with additional reference to FIGS. 6 and 7, the trigger 38 includes one or more ledges 130 extending in a forward direction from the underside 78. The ledge(s) 130 extend under the distal ends 30 of the latch arms 26, whereas a distal portion 132 of the trigger arm 72 extends over the distal ends 30. The distal portion 132 may even be cupped, troughed, curved, hooked, or otherwise shaped to create a joint (e.g., a cylindrical or hinged joint) with the distal ends 30, which may be rounded, enlarged, or the like.

By coupling the trigger 38 and latch arms 26, a user may be able to better determine if the latch arms 26 are in a deflected state. For example, if the trigger 38 and latch arms 26 were not coupled, there is a possibility of the latch arms 26 being deflected without the user noticing this. The trigger 38 in such a situation would appear normal. Moreover, the trigger 38 may make the latch arms 26 and their deflection/movement difficult to see, especially in high-density environments with many adjacent connectors and cables. If the latch arms 26 are deflected without the user knowing, the user may make a false assumption that the connector 10 is properly seated/inserted into an adapter or the like. Thus, the user may leave the connector 10 in the adapter in a condition where there is a risk of the connector 10 not mating properly and/or falling out of the adapter. By coupling the latch arms 26 and trigger 38, the trigger 38 provides tactile and/or visual feedback about whether the latch arms 26 are depressed.

Feedback about whether the latch arms 26 are depressed (and, therefore, whether the connector 10 is properly seated in an adapter) may also be provided by the locking member 40. For example, if the trigger arm 72 is depressed, the wedge 116 is positioned in the path of movement of the stop feature of the locking member 40 (e.g., the crossbar 102 in the embodiment discussed above). In other words, the wedge 116 blocks the stop feature and thereby prevents a user from being able to move the locking member 40 to its rearward position. The user then knows that the latch arms 26 are depressed, assuming the latch arms 26 are coupled to the trigger 38, or that some other condition exists potentially affecting engagement with the adapter.

Those skilled in the art will appreciate that other modifications and variations can be made without departing from the spirit or scope of the invention. For example, although the embodiments described above are fiber optic connectors and cable assemblies, the principles may be applied to other types of connectors and cables (e.g., connectors for copper cables). Since modifications, combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. A fiber optic connector, comprising:
   a connector sub-assembly including:
   a ferrule configured to support at least one optical fiber, wherein the ferrule defines a front of the fiber optic connector;
   a connector body surrounding at least a portion of the ferrule; and
   a latch arm extending outwardly and rearwardly from a portion of the connector body, wherein an end of the latch arm can be depressed toward the connector body;
   a housing in which a rear portion of the connector sub-assembly is received;

a trigger extending outwardly from the housing and over the end of the latch arm, wherein the trigger is configured to flex toward the housing to depress the latch arm; and a locking member movable between a forward position and a rearward position, wherein the forward position is closer to the front of the fiber optic connector than the rearward position, and further wherein the locking member and trigger are configured so that the locking member prevents the trigger from depressing the latch arm in the rearward position but allows the trigger to depress the latch arm in the forward position.

2. The fiber optic connector according to claim 1, wherein the latch arm and trigger are coupled so that:

the latch arm can cause the trigger to flex toward and away from the housing; and the trigger can cause the latch arm to flex toward and away from the connector body.

3. The fiber optic connector according to claim 1, wherein the trigger includes a distal portion extending over the end of the latch arm and a ledge extending under the end of the latch arm.

4. The fiber optic connector according to claim 1, wherein:

the trigger includes a topside facing away from the housing and an underside facing toward the housing; and the locking member includes a proximal portion that is on or rearward of the topside of the trigger and a distal portion that extends between the underside of the trigger and the housing.

5. The fiber optic connector according to claim 4, wherein the proximal portion of the locking member includes a raised gripping feature.

6. The fiber optic connector according to claim 4, wherein:

the underside of the trigger includes a wedge;

the distal portion of the locking member includes a stop feature; and the trigger and locking member are configured so that the stop feature on the distal portion of the locking member: a) is positioned under the wedge in the rearward position of the locking member to prevent at least some movement of the trigger toward the housing, and b) is positioned forward of the wedge in the forward position of the locking member to allow the trigger to move toward the housing and depress the latch arm.

7. The fiber optic connector according to claim 6, wherein:

the trigger includes an opening extending between the topside and underside;

the locking member includes elongated bars spaced apart from each other and a crossbar extending between the elongated bars, the elongated bars extending through the opening in the trigger, and the crossbar defining the stop feature;

the underside of the trigger includes slots configured to accommodate the elongated bars of the locking member; and the wedge of the trigger is positioned between the slots.

8. The fiber optic connector according to claim 7, wherein the trigger and locking member are configured so that the wedge: a) contacts the crossbar on the locking member in the rearward position of the locking member, and b) can be received between the elongated bars in the forward position of the locking member.

9. The fiber optic connector according to claim 1, wherein the trigger includes an opening through which the locking member extends in the forward and rearward positions of the locking member.

10. The fiber optic connector according to claim 1, wherein locking member and trigger are configured to removably secure the locking member in the forward position, rearward position, or both the forward and rearward positions.

11. The fiber optic connector according to claim 1, wherein locking member and trigger include complementary forward locking features configured to removably secure the locking member in the forward position.

12. The fiber optic connector according to claim 11, wherein the complementary forward locking features are configured to secure the locking member in the forward position using a snap-fit or interference fit with the trigger.

13. The fiber optic connector according to claim 11, wherein the complementary forward locking features comprise a post on one of the locking member and the trigger and a slot on the other of the locking member and the trigger.

14. The fiber optic connector according to claim 1, wherein locking member and trigger include complementary rearward locking features configured to secure the locking member in the rearward position.

15. The fiber optic connector according to claim 14, wherein the complementary rearward locking features are configured to secure the locking member in the rearward position using a snap-fit or interference fit with the trigger.

16. The fiber optic connector according to claim 14, wherein the complementary rearward locking features comprise a socket area on the trigger and a shoulder on the locking member configured to be received in the socket area.

17. The fiber optic connector according to claim 1, wherein:

the connector sub-assembly is a first connector sub-assembly;

the fiber optic connector further comprises a second connector sub-assembly similar to the first connector sub-assembly;

a rear portion of the second connector sub-assembly is received in the housing; and the trigger and locking member cooperate in the same manner with the second connector sub-assembly as with the first connector sub-assembly.

18. The fiber optic connector according to claim 1, wherein the trigger is removably coupled to the housing.

19. A telecommunication connector, comprising:

a connector sub-assembly including:

a connector body; and a latch arm extending outwardly and rearwardly from a portion of the connector body, wherein an end of the latch arm can be depressed toward to the connector body;

a housing in which a rear portion of the connector sub-assembly is received;

a trigger extending outwardly from the housing and over the end of the latch arm, wherein the trigger is configured to move toward the housing to depress the latch arm; and a locking member movable between a forward position and a rearward position relative to the trigger, wherein the locking member and trigger are configured so that the locking member prevents the trigger from depressing the latch arm in the rearward position but allows the trigger to depress the latch arm in the forward position.

20. The telecommunication connector according to claim 19, wherein the connector sub-assembly further includes a ferrule configured to support at least one optical fiber, and wherein the connector body surrounds at least a portion of the ferrule.

21. A fiber optic connector, comprising:
a connector sub-assembly including:
a ferrule configured to support at least one optical fiber, wherein the ferrule defines a front of the fiber optic connector;
a connector body surrounding at least a portion of the ferrule; and
a latch arm extending outwardly and rearwardly from a portion of the connector body, wherein an end of the latch arm can be depressed toward the connector body;
a housing in which a rear portion of the connector sub-assembly is received;
a trigger extending outwardly from the housing and over the end of the latch arm, wherein the trigger is configured to flex toward the housing to depress the latch arm; and
locking means for preventing the trigger from depressing the latch arm when the locking means is in a rearward position, wherein the locking means is movable relative to the trigger to a forward position that is closer to the front of the fiber optic connector, and further wherein the locking means allows the trigger to depress the latch arm in the forward position.

22. A fiber optic cable assembly, comprising:
a cable including at least one optical fiber; and
a fiber optic connector secured to an end of the cable, the fiber optic connector comprising:
a connector sub-assembly including:
a ferrule configured to support at least one optical fiber, wherein the ferrule defines a front of the fiber optic connector;
a connector body surrounding at least a portion of the ferrule; and
a latch arm extending outwardly and rearwardly from a portion of the connector body, wherein an end of the latch arm can be depressed toward the connector body;
a housing in which a rear portion of the connector sub-assembly is received;
a trigger extending outwardly from the housing and over the end of the latch arm, wherein the trigger is configured to flex toward the housing to depress the latch arm; and
a locking member movable between a forward position and a rearward position, wherein the forward position is closer to the front of the fiber optic connector than the rearward position, and further wherein the locking member and trigger are configured so that the locking member prevents the trigger from depressing the latch arm in the rearward position but allows the trigger to depress the latch arm in the forward position.

23. A method of securing a fiber optic connector, the fiber optic connector including a connector sub-assembly having a connector body and a latch arm that extends outwardly and rearwardly from a portion of the connector body, a housing in which a rear portion of the connector sub-assembly is received, a trigger extending outwardly from the housing and over the end of the latch arm, a locking member that is movable relative to the trigger between a forward position and a rearward position, the method comprising:
depressing the latch arm of the connector sub-assembly toward the connector body, wherein the locking member is in the forward position when the latch arm is depressed;
inserting a portion of the fiber optic connector into an adapter;
causing the latch arm to move away from the connector body so that the latch arm engages the adapter in a manner that retains the portion of the fiber optic connector in the adapter; and
moving the locking member to the rearward position after the latch arm engages the adapter, wherein the locking member and trigger are configured so that the locking member prevents the trigger from depressing the latch arm in the rearward position.

24. The method according to claim 23, wherein depressing the latch arm comprises moving the trigger toward the housing to depress the latch arm toward the connector body.

25. The method according to claim 23, wherein the latch arm is depressed by inserting the portion of the fiber optic connector into the adapter.

26. The method according to claim 23, further comprising:
moving the locking member from the rearward position back to the forward position;
depressing the latch arm of the connector sub-assembly toward the connector body so that the latch arm no longer retains the portion of the fiber optic connector in the adapter; and
removing the fiber optic connector from the adapter.

* * * * *